United States Patent
Sielagoski et al.

(10) Patent No.: US 6,208,106 B1
(45) Date of Patent: Mar. 27, 2001

(54) METHOD AND SYSTEM FOR ADJUSTING HEADWAY IN AN ADAPTIVE SPEED CONTROL SYSTEM BASED ON ROAD SURFACE COEFFICIENT OF FRICTION

(75) Inventors: Gerald L. Sielagoski, St. Clair Shores; Mark Peter Friedrich, Clinton Township; Sam G. Rahaim, Ann Arbor, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/470,368

(22) Filed: Dec. 22, 1999

(51) Int. Cl.$^7$ .............. B64C 13/18; G05D 1/08
(52) U.S. Cl. ............... 318/586; 318/599; 318/587; 318/489; 123/349; 123/350; 123/361; 701/65; 701/93; 701/96; 303/148; 303/149; 303/150
(58) Field of Search .................. 318/599, 561, 318/138, 483, 587, 489, 586; 180/116, 118, 119, 197; 123/349, 350, 351, 352, 353, 361; 701/65, 70, 93, 96, 97, 117; 303/132, 140, 146, 147, 148, 149, 150

(56) References Cited

U.S. PATENT DOCUMENTS

| 4,987,357 | * | 1/1991 | Masaki | 318/587 |
| 5,107,429 | * | 4/1992 | Sol | 364/426.03 |
| 5,132,906 | * | 7/1992 | Sol et al. | 364/426.02 |
| 5,173,859 | * | 12/1992 | Deering | 364/426.01 |
| 5,676,434 | * | 10/1997 | Ichikawa et al. | 303/150 |
| 6,009,368 | * | 12/1999 | Labuhn et al. | 701/96 |
| 6,015,192 | * | 1/2000 | Fukumura | 303/140 |

FOREIGN PATENT DOCUMENTS

| 356034551 | * | 4/1981 | (JP) | 180/197 |
| 362120258 | * | 6/1987 | (JP) | 303/150 |
| 362283050 | * | 12/1987 | (JP) | 303/150 |
| 363064859 | * | 3/1988 | (JP) | 303/150 |

* cited by examiner

Primary Examiner—Robert E. Nappi
Assistant Examiner—Edgardo San Martin
(74) Attorney, Agent, or Firm—Mark L. Mollon

(57) ABSTRACT

In an adaptive speed control system for a vehicle, a method and system for automatically adjusting a selected following interval for the vehicle based on driving conditions is provided. The method includes determining a driving surface coefficient of friction based on a driven wheel speed of the vehicle, and adjusting the selected following interval for the vehicle based on the driving surface coefficient of friction. The system includes a receiver capable of receiving a signal indicative of a driven wheel speed of the vehicle, and a controller capable of determining a driving surface coefficient of friction based on the driven wheel speed, and capable of adjusting the selected following interval for the vehicle based on the driving surface coefficient of friction.

16 Claims, 1 Drawing Sheet

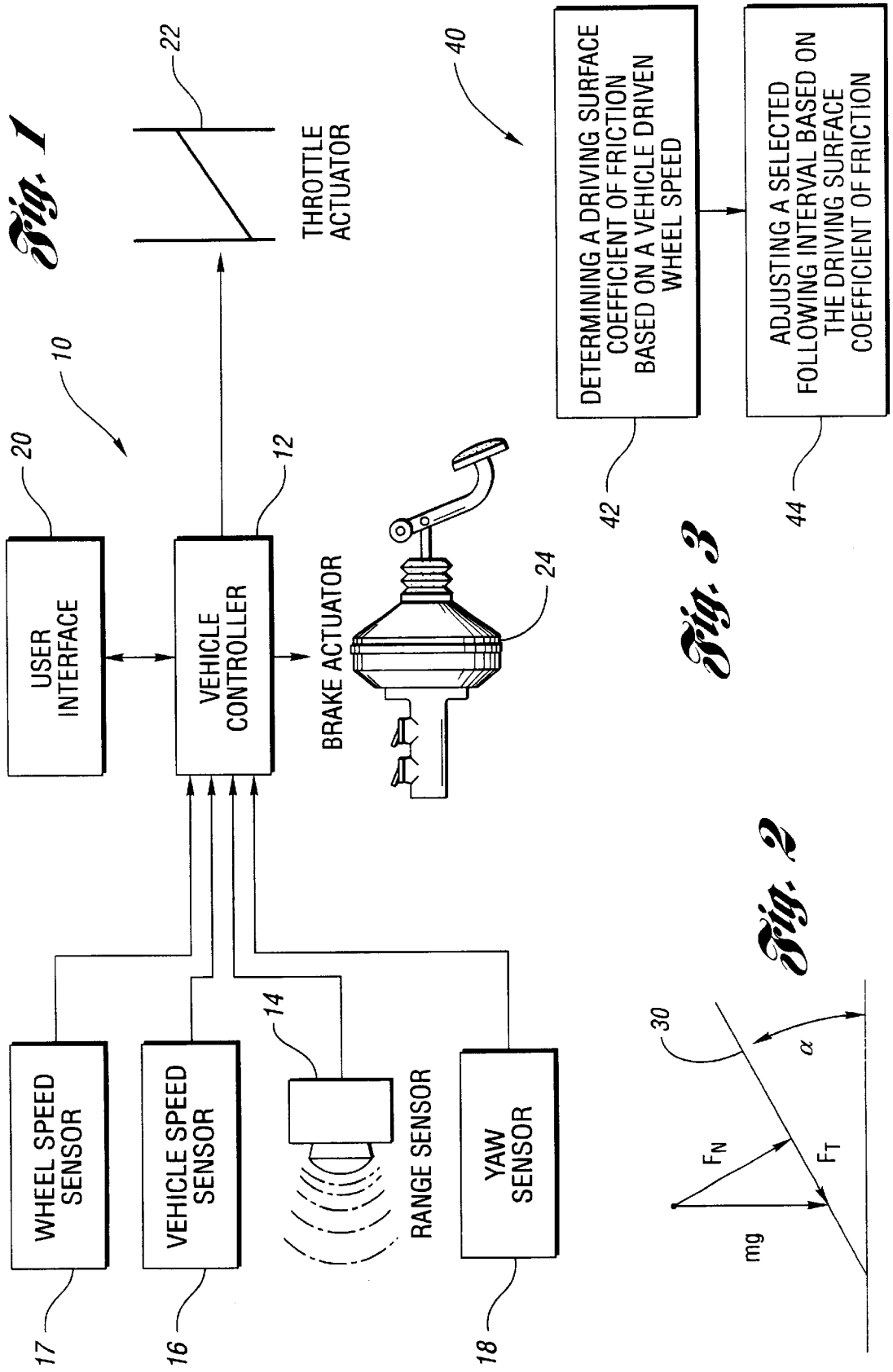

METHOD AND SYSTEM FOR ADJUSTING HEADWAY IN AN ADAPTIVE SPEED CONTROL SYSTEM BASED ON ROAD SURFACE COEFFICIENT OF FRICTION

TECHNICAL FIELD

This invention relates to a method and system for adjusting the following interval of a vehicle equipped with an adaptive speed control system based on the driving surface coefficient of friction.

BACKGROUND ART

Adaptive Cruise (i.e., speed) Control (ACC) systems operate much like conventional Cruise Control systems, with the added capability of being able to sense in-path vehicles and to slow the ACC equipped vehicle in response. An ACC equipped vehicle thereby allows its operator to automatically control the vehicle speed, as with conventional Cruise Control, without the necessity of having to deactivate and reactivate control whenever slower traffic is encountered.

As is well known in the art, existing ACC methods and systems use a forward looking range sensor such as radar to sense an in-path vehicle (which may also be referred to as a sensed target or primary target). Based on the radar sensor information, such ACC methods and systems then determine the range and relative velocity (or range rate) of the sensed in-path vehicle. Using the range and range rate, the speed of the ACC equipped vehicle is controlled to maintain a selected following interval between the ACC equipped vehicle and the sensed in-path vehicle. The speed of the ACC equipped vehicle is typically controlled by automatic control of the vehicle throttle actuator. In more advanced ACC methods and systems, vehicle speed may also be controlled by automatic control of vehicle brake actuators. Such ACC methods and systems have the ability to apply a moderate degree of braking to the vehicle to achieve further vehicle deceleration (i.e., in addition to vehicle deceleration achieved via throttle control) in response to an in-path vehicle.

Existing ACC methods and systems, however, generally do not take into account driving surface conditions. More particularly, the time necessary for a vehicle operator is to slow a vehicle to a selected speed is optimal on those driving surfaces having high coefficients of friction, such as those provided by dry, concrete or asphalt pavement. That time generally increases when the driving surface coefficient of friction deceases, such as when the driving surface is wet, or is covered by snow or ice. Existing ACC methods and systems, however, control the vehicle speed to maintain the following interval selected (either by the vehicle operator or by default) regardless of the driving surface coefficient of friction.

Thus, there exists a need, in an ACC system, for a method and system for automatically adjusting the following interval of the ACC equipped vehicle based on the driving surface coefficient of friction. Such a method and system would determine a driving surface coefficient of friction based on a driven wheel speed of the ACC equipped vehicle, and adjust the selected following interval for the ACC equipped vehicle based on the driving surface coefficient of friction.

DISCLOSURE OF INVENTION

Accordingly, it is a principal object of the present invention to provide, in an adaptive speed control system for a vehicle, a method and system for automatically adjusting a selected following interval for the vehicle based on the driving surface coefficient of friction.

According to the present invention, then, in an adaptive speed control system for a vehicle, a method and system are provided for automatically adjusting a selected following interval for the vehicle based on driving conditions. The method of the present invention comprises determining a driving surface coefficient of friction based on a driven wheel speed of the vehicle, and adjusting the selected following interval for the vehicle based on the driving surface coefficient of friction.

The system of the present invention includes a receiver capable of receiving a signal indicative of a driven wheel speed of the vehicle, and a controller capable of determining a driving surface coefficient of friction based on the driven wheel speed. The controller is further capable of adjusting the selected following interval for the vehicle based on the driving surface coefficient of friction.

These and other objects, features and advantages of the present invention will be readily apparent upon consideration of the following detailed description of the invention in conjunction with the accompanying drawings.

BRIEF DESCRIPTION OF DRAWINGS

FIG. 1 is a simplified block diagram of an adaptive cruise control system, including the system of the present invention;

FIG. 2 is a simplified diagram of the forces exerted on a vehicle on a driving surface; and FIG. 3 is a flowchart of the method of the present invention.

BEST MODE FOR CARRYING OUT THE INVENTION

Referring to FIGS. 1–3, the preferred embodiment of the method and system of the present invention will now be described. In that regard, FIG. 1 illustrates a simplified block diagram of an Adaptive Cruise Control (ACC) system, including the system of the present invention, denoted generally by reference numeral 10.

In general, as is well known to those of ordinary skill in the art, ACC system (10) is a closed loop control system intended to respond to potential targets in front of and in the same lane of traffic as the vehicle equipped with the ACC system (10). The goal of ACC system (10) is to partially automate the continuous longitudinal control of the vehicle, thereby providing the vehicle operator with improved comfort and convenience. In that regard, ACC system (10) may operate in either a normal or a following mode. In normal mode operation, ACC system (10) controls the speed of the ACC equipped vehicle to the speed set by the vehicle operator as the control speed. In following mode operation, ACC system (10) controls the speed of the ACC equipped vehicle to the speed of a sensed in-path vehicle (which may be referred to as a sensed target or a primary target).

More specifically, as seen in FIG. 1, the ACC system (10) includes a vehicle controller (12) provided in communication with a range sensor (14), a vehicle speed sensor (16), a driven wheel speed sensor (17), a yaw rate sensor (18), a user interface (20), a throttle actuator (22), and a brake actuator (24). As previously described, the system (10) extends the function of conventional speed control systems. In that regard, based on range and relative velocity information obtained and/or derived from forward looking range sensor (14) and speed sensor (16), vehicle controller (12) uses throttle and brake actuators (22, 24) to control the speed of the ACC equipped vehicle in order to maintain a selected following interval (in seconds) between the ACC equipped vehicle and a sensed target in the forward path of travel of the ACC equipped vehicle (i.e., a lead vehicle).

The following interval between the ACC equipped vehicle and the sensed target is initially set at a default value (typically two seconds) upon activation of the system (10), but may be modified by the vehicle operator to any of a number of other selectable values via user interface (20). The default following interval is typically the maximum following interval allowed, and modification of the following interval by the vehicle operator is permitted between that maximum and a defined minimum following interval. The following interval is referred to as headway, and is defined as the range to the sensed target (in meters), divided by the speed of the ACC equipped vehicle (in meters per second). User interface (20) is also used by the vehicle operator to set the desired vehicle control speed.

As previously noted, ACC systems and methods are well known in the art. As a result, a detailed description of the general operation of ACC system (10), including such functions as acquisition, discrimination, differentiation, selection and tracking of targets, range and relative velocity (including range rate) determinations, sensor operations, and throttle and brake control is unnecessary and, for the sake of brevity, is not set forth herein. In connection with the method and system of the present invention, such functions of ACC system (10) may be undertaken in any fashion known to those of ordinary skill.

As also previously noted, existing ACC methods and systems, however, generally do not take into account driving surface conditions. More particularly, the time necessary for a vehicle operator is to slow a vehicle to a selected speed is optimal on those driving surfaces having high coefficients of friction, such as those provided by dry, concrete or asphalt pavement. That time generally increases when the driving surface coefficient of friction deceases, such as when the driving surface is wet, or is covered by snow or ice. Existing ACC methods and systems, however, control the vehicle speed to maintain the following interval selected (either by the vehicle operator or by default) regardless of the driving surface coefficient of friction.

In contrast, the present invention provides, in the ACC system (10) of FIG. 1, a method and system for automatically adjusting the following interval of the ACC equipped vehicle based on the driving surface coefficient of friction. In general, the present invention increases the following interval as the driving surface coefficient of friction decreases, such as on wet, or snow or ice covered pavement. Still further, if the driving surface coefficient of friction becomes too low, the present invention deactivates the ACC system.

More specifically, still referring to FIG. 1, the system of the present invention is preferably included in vehicle controller (12). In that regard, vehicle controller (12) includes a receiver (not shown) capable of receiving an input signal from driven wheel speed sensor (17) indicative of the speed of a driven wheel of the ACC equipped vehicle. Vehicle controller (12) also includes a controller (not shown) capable of determining a driving surface coefficient of friction based on a driven wheel speed of the ACC equipped vehicle, and adjusting the selected following interval for the ACC equipped vehicle based on the driving surface coefficient of friction determined. It should be noted here that the controller (as well as vehicle controller (12) of ACC system (10)) may take the form of an appropriately programmed microprocessor, or any equivalent thereof.

According to the present invention, the controller of the system preferably determines the driving surface coefficient of friction as follows, although other techniques for determining such a coefficient may also be employed. In that regard, it is known that the dynamics equation for a vehicle may be expressed as $$J\omega' = T - \mu mgr \cos \alpha,$$

where J is a driven wheel inertia, $\omega'$ is a driven wheel acceleration, T is a driven wheel torque, $\mu$ is the driving surface coefficient of friction, m is the mass of the vehicle, g is gravitational acceleration, r is a driven wheel radius, and $\alpha$ is the angle of inclination of the driving surface. Solving this equation for the driving surface coefficient of friction, $\mu$, it can be seen that $$\mu = (T - J\omega')/mgr \cos \alpha. \tag{1}$$

Referring now to FIG. 2, a simplified diagram of the forces exerted on a vehicle on a driving surface is shown. As seen therein, on a driving surface (30) having an angle of inclination, $\alpha$, a vehicle experiences a gravitational force equal to the mass of the vehicle, m, multiplied by the acceleration of gravity, g. That gravitational force is also equal to the sum of a normal force, $F_N$, and a force due to torque on the vehicle, $F_T$. From the diagram, it can thus be seen that $$F_N = mg \cos \alpha \tag{2}$$

and that $$F_T = mg \sin \alpha. \tag{3}$$

It is known that the force experienced by a moving vehicle is equal to the mass of the vehicle, m, multiplied by the acceleration of the vehicle, x". That same force is also equal to the difference between the force exerted on the vehicle due to friction, $F_{frict}$, and the force due to torque, $F_T$. That is, $$mx'' = F_{frict} - F_T. \tag{4}$$

It is also known that the frictional force, $F_{frict}$, is equal to the normal force, $F_N$, multiplied by the driving surface coefficient of friction, $\mu$. Thus, $$F_{frict} = \mu F_N. \tag{5}$$

Using equations (1), (2), (3) and (5), it can be seen that equation (4) may be re-written as $$mx'' = [(T - J\omega')/r] - mg \sin \alpha \tag{6}$$

From equation (6), $\alpha$, the angle of inclination of the driving surface, may be expressed as $$\alpha = \sin^{-1}[(T - J\omega' - mx''r)/mgr]. \tag{7}$$

Using equation (7), it can be seen that equation (1) may be rewritten so that the driving surface coefficient of friction, $\mu$, may be finally expressed as $$\mu = (T - J\omega')/mgr \cos\{\sin^{-1}[(T - J\omega' - mx''r)/mgr]\}. \tag{8}$$

Thus, referring again to FIG. 1, as previously noted, the controller of the system of the present invention is preferably included in vehicle controller (12), and is capable of determining a driving surface coefficient of friction. To do so, the controller of the system is preferably capable of calculating a driving surface coefficient of friction according to equation (8), above. In that regard, each of the variables in equation (8) are either known, or measured or derived in conventional fashion. For example, vehicle speed sensor (16) measures a vehicle speed (at a non-driven wheel), from which vehicle acceleration, x", is derived. Driven wheel speed sensor (17) measures a driven wheel speed, from which driven wheel acceleration, ω', is derived. A measured throttle position and engine RPM have an associated engine torque. Engine torque and known transmission axle gear ratios may be used to determine wheel torque, T.

As also previously noted, the controller of the system of the present invention is capable of adjusting the selected following interval for the vehicle based on the driving surface of coefficient determined. To do so, the controller may be capable of determining a ratio of the driving surface coefficient of friction and a selected coefficient of friction value, and scaling the selected following distance based on the ratio of the driving surface coefficient of friction and a selected coefficient of friction value.

Alternatively, to adjust the selected following interval for the vehicle based on the driving surface of coefficient determined, the controller may be capable of comparing the driving surface coefficient of friction to a coefficient of friction threshold and, when the driving surface coefficient of friction is less than the coefficient of friction threshold, adjusting the selected following interval based on the difference between the coefficient of friction threshold and the driving surface coefficient of friction. In that regard, adjusting the selected following interval based on such a difference may include adjusting the selected following interval in direct relationship to that difference. That is, when the driving surface coefficient of friction is less than the coefficient of friction threshold, adjusting the selected following interval includes both increasing the selected following interval when the difference between the coefficient of friction threshold and the driving surface of coefficient of friction increases, as well as decreasing the selected following interval when that difference decreases.

The selected following interval is preferably adjusted proportionally to the difference between the coefficient of friction threshold and the driving surface coefficient of friction. As used herein, proportional adjustment is intended to include linear, as well as other functions. In that regard, according to the present invention, the selected following interval may be capable of varying continuously as the difference between the coefficient of friction threshold and the driving surface of coefficient of friction continuously varies. Alternatively, the selected following interval may be capable of varying between a plurality of values in a step-like fashion, wherein each one of those values corresponds to one of a plurality of ranges of driving surface coefficient of friction values. That is, when the driving surface coefficient of friction is less than the coefficient of friction threshold, the selected following interval may be adjusted to a first value when the value of the driving surface coefficient of friction falls within a first range, and adjusted to a second value when the value of the driving surface coefficient of friction transitions to a second range.

Still further, the controller of the system of the present invention is also capable of comparing the driving surface coefficient of friction to a deactivation coefficient of friction threshold, and deactivating the adaptive speed control system when the driving surface coefficient of friction is less than the deactivation coefficient of friction threshold. In such a fashion, the present invention deactivates ACC system (10) in the event the driving surface coefficient of friction becomes too low. In that regard, the deactivation coefficient of friction threshold is a value less than the coefficient of friction threshold previously described. Moreover, both such thresholds may be predefined, and determined empirically.

Referring now to FIG. 3, a flowchart of the method of the present invention is shown, denoted generally by reference numeral 40. As seen therein, the method (40) of the present invention comprises, in an ACC system, determining (42) a driving surface coefficient of friction based on a driven wheel speed of the vehicle, and adjusting (44) the selected following interval for the vehicle based on the driving surface coefficient of friction. As noted above in connection with the description of the system of the present invention, determining (42) a driving surface coefficient of friction preferably comprises calculating a driving surface coefficient of friction according to the equation $$\mu = (T - J\omega')/mgr \, \cos\{\sin^{-1}[(T - J\omega' - mx''r)/mgr]\}, \quad (8)$$

where $\mu$ is the driving surface coefficient of friction, T is a driven wheel torque, J is a driven wheel inertia, ω' is a driven wheel acceleration, m is a mass of the vehicle, g is an acceleration due to gravity, r is a radius of a driven wheel, and x" is a vehicle acceleration.

As also noted above, adjusting (44) the selected following interval may comprise determining a ratio of the driving surface coefficient of friction and a selected coefficient of friction value, and scaling the selected following distance based on the ratio of the driving surface coefficient of friction and a selected coefficient of friction value. Alternatively, adjusting (44) the selected following interval may comprise comparing the driving surface coefficient of friction to a coefficient of friction threshold and, when the driving surface coefficient of friction is less than the coefficient of friction threshold, adjusting the selected following interval based on the difference between the coefficient of friction threshold and the driving surface coefficient of friction. In that regard, adjusting the selected following interval based on such a difference may include adjusting the selected following interval in direct relationship to that difference. That is, when the driving surface coefficient of friction is less than the coefficient of friction threshold, adjusting the selected following interval includes both increasing the selected following interval when the difference between the coefficient of friction threshold and the driving surface of coefficient of friction increases, as well as decreasing the selected following interval when that difference decreases.

Once again, the selected following interval is preferably adjusted proportionally to the difference between the coefficient of friction threshold and the driving surface coefficient of friction. In that regard, the selected following interval may be capable of varying continuously as the difference between the coefficient of friction threshold and the driving surface of coefficient of friction continuously varies. Alternatively, the selected following interval may be capable of varying between a plurality of values in a step-like fashion, wherein each one of those values corresponds to one of a plurality of ranges of driving surface coefficient of friction values.

The method of the present invention may further comprise comparing the driving surface coefficient of friction to a deactivation coefficient of friction threshold, and deactivating the adaptive speed control system when the driving surface coefficient of friction is less than the deactivation coefficient of friction threshold. In such a fashion, the method of the present invention deactivates ACC system (10) in the event the driving surface coefficient of friction becomes too low.

From the foregoing description, it can be seen that the present invention provides, in an ACC system, a method and system for adjusting the following interval of an ACC equipped vehicle based on the coefficient of friction of the driving surface. More particularly, the present invention generally increases the following interval as the driving surface coefficient of friction decreases, such as on wet, or snow or ice covered pavement. Still further, if the driving surface coefficient of friction becomes too low, the present invention deactivates the ACC system.

While various embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an adaptive speed control system for a vehicle, a method for automatically adjusting a selected following interval for the vehicle based on driving conditions, the method comprising:

determining a driving surface coefficient of friction based on a driven wheel speed of the vehicle; and adjusting the selected following interval for the vehicle based on the driving surface coefficient of friction, wherein adjusting the selected following interval comprises comparing the driving surface coefficient of friction to a coefficient of friction threshold; and when the driving surface coefficient of friction is less than the coefficient of friction threshold, adjusting the selected following interval based on the difference between the coefficient of friction threshold and the driving surface coefficient of friction.

2. The method of claim 1 wherein adjusting the selected following interval based on the difference between the coefficient of friction threshold and the driving surface coefficient of friction includes adjusting the selected following interval in direct relationship to the difference between the coefficient of friction threshold and the driving surface coefficient of friction.

3. The method of claim 2 wherein adjusting the selected following interval in direct relationship to the difference between the coefficient of friction threshold and the driving surface coefficient of friction includes increasing the selected following interval when the difference between the coefficient of friction threshold and the driving surface coefficient of friction increases.

4. The method of claim 2 wherein adjusting the selected following interval in direct relationship to the difference between the coefficient of friction threshold and the driving surface coefficient of friction includes decreasing the selected following interval when the difference between the coefficient of friction threshold and the driving surface coefficient of friction decreases.

5. The method of claim 1 wherein the selected following interval is capable of varying continuously.

6. The method of claim 1 wherein the selected following interval is capable of varying between a plurality of values, each value corresponding to one of a plurality of ranges of driving surface coefficients of friction.

7. The method of claim 1 further comprising:

comparing the driving surface coefficient of friction to a deactivation coefficient of friction threshold; and deactivating the adaptive speed control system when the driving surface coefficient of friction is less than the deactivation coefficient of friction threshold.

8. The method of claim 1 wherein determining a driving surface coefficient of friction comprises calculating a driving surface coefficient of friction according to the equation:

$$\mu = (T - J\omega')/mgr \cos\{\sin^{-1}[(T - J\omega' - mx''r)/mgr]\}$$

where $\mu$ is the driving surface coefficient of friction, T is a driven wheel torque, J is a driven wheel inertia, $\omega'$ is a driven wheel acceleration, m is a mass of the vehicle, g is an acceleration due to gravity, r is a radius of a driven wheel, and x" is a vehicle acceleration.

9. In an adaptive speed control system for a vehicle, a system for automatically adjusting a selected following interval for the vehicle based on driving conditions, the system comprising:

a receiver capable of receiving a signal indicative of a driven wheel speed of the vehicle; and a controller capable of determining a driving surface coefficient of friction based on the driven wheel speed, and adjusting the selected following interval for the vehicle based on the driving surface coefficient of friction, wherein, to adjust the selected following interval, the controller is capable of comparing the driving surface coefficient of friction to a coefficient of friction threshold and, when the driving surface coefficient of friction is less than the coefficient of friction threshold, adjusting the selected following interval based on a difference between the coefficient of friction threshold and the driving surface coefficient of friction.

10. The system of claim 9 wherein, to adjust the selected following interval based on the difference between the coefficient of friction threshold and the driving surface coefficient of friction, the controller is capable of adjusting the selected following interval in direct relationship to the difference between the coefficient of friction threshold and the driving surface coefficient of friction.

11. The system of claim 10 wherein, to adjust the selected following interval in direct relationship to the difference between the coefficient of friction threshold and the driving surface coefficient of friction, the controller is capable of increasing the selected following interval when the difference between the coefficient of friction threshold and the driving surface coefficient of friction increases.

12. The system of claim 10 wherein, to adjust the selected following interval in direct relationship to the difference between the coefficient of friction threshold and the driving surface coefficient of friction, the controller is capable of decreasing the selected following interval when the difference between the coefficient of friction threshold and the driving surface coefficient of friction decreases.

13. The system of claim 9 wherein the selected following interval is capable of varying continuously.

14. The system of claim 9 wherein the selected following interval is capable of varying between a plurality of values, each value corresponding to one of a plurality of ranges of driving surface coefficients of friction.

15. The system of claim 9 wherein the controller is further capable of comparing the driving surface coefficient of friction to a deactivation coefficient of friction threshold, and deactivating the adaptive speed control system when the driving surface coefficient of friction is less than the deactivation coefficient of friction threshold.

16. The system of claim 9 wherein, to determine a driving surface coefficient of friction, the controller is capable of calculating a driving surface coefficient of friction according to the equation:

$$\mu=(T-J\omega')/mgr \cos\{\sin^{-1}[(T-J\omega'-mx''r)/mgr]\}$$

where $\mu$ is the driving surface coefficient of friction, T is a driven wheel torque, J is a driven wheel inertia, $\omega'$ is a driven wheel acceleration, m is a mass of the vehicle, g is an acceleration due to gravity, r is a radius of a driven wheel, and x" is a vehicle acceleration.

* * * * *